United States Patent [19]

Takizawa et al.

[11] Patent Number: 4,755,978
[45] Date of Patent: Jul. 5, 1988

[54] DISC PLAYER

[75] Inventors: Kazuyuki Takizawa, Chiba; Hiroyuki Urushibata, Kanagawa; Yoshiaki Kumagai, Tokyo, all of Japan

[73] Assignee: Sony Corporation, Tokyo, Japan

[21] Appl. No.: 13,232

[22] Filed: Feb. 10, 1987

[30] Foreign Application Priority Data

Feb. 18, 1986 [JP] Japan .................. 61-032023

[51] Int. Cl.$^4$ .................. G11B 17/22; G11B 17/26
[52] U.S. Cl. .................. 369/37; 369/75.2; 369/194
[58] Field of Search .................. 369/75.2, 265, 197, 369/198, 36, 37, 191, 194

[56] References Cited

U.S. PATENT DOCUMENTS

| 4,566,087 | 1/1986 | Kraft | 369/37 |
| 4,670,866 | 6/1987 | Hasegawa et al. | 369/194 |

FOREIGN PATENT DOCUMENTS

| 219555 | 3/1910 | Fed. Rep. of Germany | 369/194 |
| 176875 | 3/1922 | United Kingdom | 369/194 |

Primary Examiner—Steven L. Stephan
Attorney, Agent, or Firm—Alvin Sinderbrand

[57] ABSTRACT

A disc player has a slide table mounted to slide horizontally into and out of a casing, a disc tray supported rotatably on the slide table and having a plurality of recessed disc storage areas arranged about its center of rotation to store a plurality of discs on its top surface a drive mechanism for rotating the disc tray and halting it at predetermined positions, an optical pickup and a turntable disposed within the casing at a play position for reproducing the disc placed at the play position by the disc tray, and a loading mechanism for displacing the slide table and controlling rotation of the disc tray so that, when the slide table is displaced from a first position outside of the casing to a second position within the casing, the foremost disc storage area of the disc tray in the first position is rotated to the play position in the second position. Further, the optical pickup and the turntable are moved upward by the loading mechanism with respect to the disc tray when the slide table is moved to the second position so that the disc set at the play position is held between the turntable and a disc presser while being kept afloat from the disc tray.

5 Claims, 7 Drawing Sheets

DISC PLAYER

BACKGROUND OF THE INVENTION

1. Field of the Invention

The present invention relates to a disc player capable of reproducing, either in sequence or in accordance with a program, one or more rotary recording media stored therein.

2. Description of the Prior Art

In the conventional record players or apparatus for reproducing compact discs, there is known a type which stores a plurality of discs therein and is capable of selectively playing a desired one of such discs in response to an external operation.

However, since any player having such a changer function is designed essentially for accommodating a multiplicity of software discs amounting to several tens or so, it is unavoidable that the apparatus becomes dimensionally large and expensive with the result that it is difficult to attain widespread use of such player among the general public. Furthermore, in an apparatus designed for compact discs (CD) as musical software, it is necessary to accommodate packages or the like for storing several compact discs in layers, so that a changer mechanism employed for reproducing a desired one of a number of discs is necessarily complicated and of undesirably increased thickness.

OBJECTS AND SUMMARY OF THE INVENTION

It is an object of the present invention to provide a disc player which avoids the above-mentioned problems associated with the prior art. More specifically, an object of this invention resides in providing a small-sized disc player which is capable of playing a plurality of discs singularly or in sequence by such simple manipulation as is performed in an ordinary type player for reproducing a single disc. In a disc player according to the present invention, a rotatable disc tray for storing a plurality of discs on respective storage areas arranged about its center of rotation is disposed in a slide table, so that one or more discs stored in the tray are selectively reproducible. Accordingly, a plurality of desired discs can be stored in the player to consequently enhance the reproduction capability, and the player can be dimensionally reduced in thickness due to employment of such disc tray. Furthermore, when the slide table is displaced from a forwardly extended position into a casing, the disc tray can be rotated to bring the disc which is foremost with the slide table in its extended position to a play position within the casing, thereby enhancing the operational facility remarkably.

For the purpose of solving the aforesaid problems, the disc player of the present invention includes a slide table which can be displaced into and out of a casing similarly to a known disc or record driving mechanism; a disc tray rotatable on the slide table and capable of storing a plurality of discs on its top surface; a drive mechanism for drawing in the slide table and locking it at a predetermined position; a rotary drive mechanism for rotating the disc tray in accordance with a selected operation mode; and a pickup member for reproducing signals prerecorded on the disc.

According to one aspect of the present invention, there is provided a disc player comprising a slide table mounted to slide horizontally into and out of a casing; a disc tray supported rotatably on the slide table and having a plurality of disc storage areas arranged about its center of rotation to store a plurality of discs on its upper surface; a drive means for rotating the disc tray and halting it at a predetermined position; an optical pickup and a turntable for reproducing a disc placed at a play position by the disc tray; and a loading mechanism for disposing the slide table at a loading position within the casing. In such a construction, when the slide table is displaced from a first position outside of the casing to the second or loading position within the casing, the foremost disc storage area of the disc tray with the slide table in the first position is rotated to the play position when the slide table is moved to the second position.

Due to employment of the disc tray driven by a rotation controller which is rotated to and halted at a predetermined position on the top surface of the slide table when the latter is displaced for drawing the disc tray into the casing, any desired disc can be loaded and reproduced by an ordinary manipulation as in the known disc reproducing apparatus, and also a plurality of discs stored previously are reproducible one by one in a simple procedure.

Figure 1:
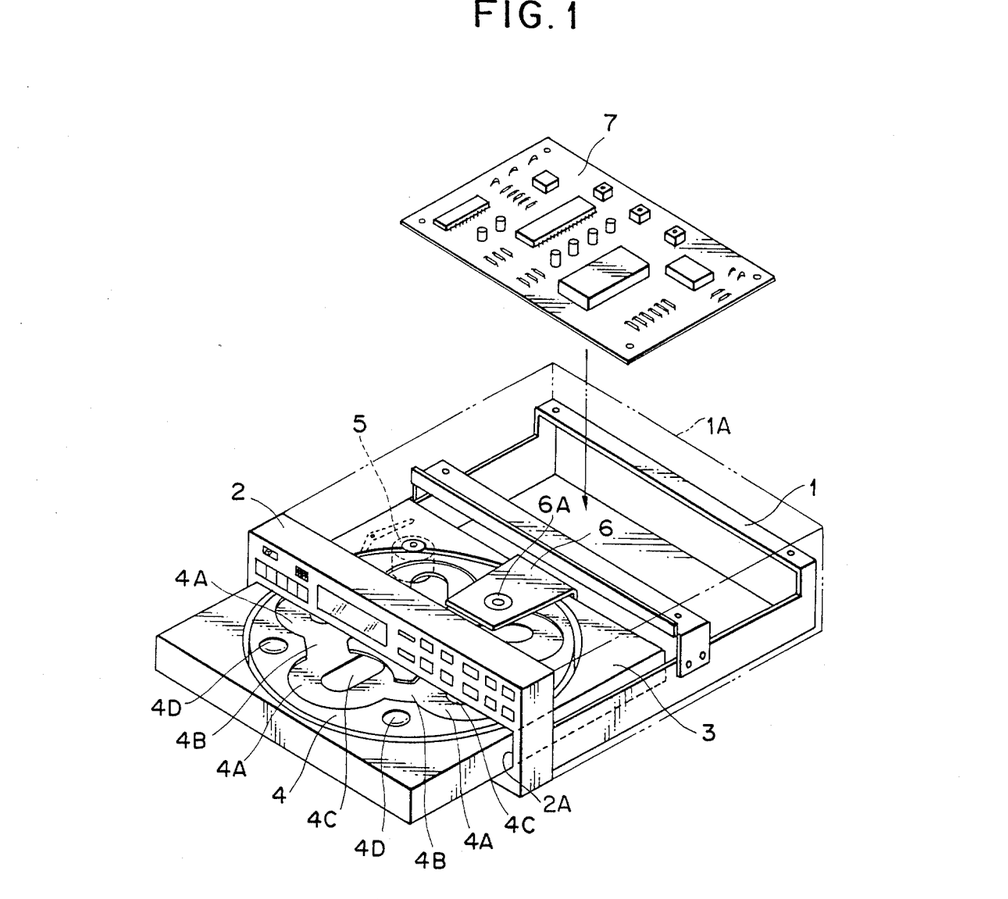
FIG. 1 is an exploded perspective view schematically showing a disc player according to an embodiment of the present invention.

DETAILED DESCRIPTION OF THE PREFERRED EMBODIMENTS:

FIG. 1 schematically illustrates a disc player embodying the present invention, and which comprises a chassis 1 within a casing 1A of the disc player, a front control panel 2, and a slide table 3 movable into and out of a front opening 2A formed in the control panel 2.

A circular disc tray 4 is supported rotatably at its center on a recessed surface of the slide table 3, and five recessed disc storage areas 4A for positioning five compact disc respectively, are formed in the top surface of the tray 4 at locations arranged about the center of tray 4. The adjacent side portions of such disc storage areas 4A mutually communicate with each other through channels 4B for permitting easy withdrawal of the stored discs. Within the disc storage areas 4A are formed openings 4c which are substantially rectangular with rounded ends and extend radially from the central region of the tray 4. Depressions 4D are formed also in the rotary disc tray 4 between the areas 4A to be useful for enabling manual rotation of the disc tray 4.

Figure 2:
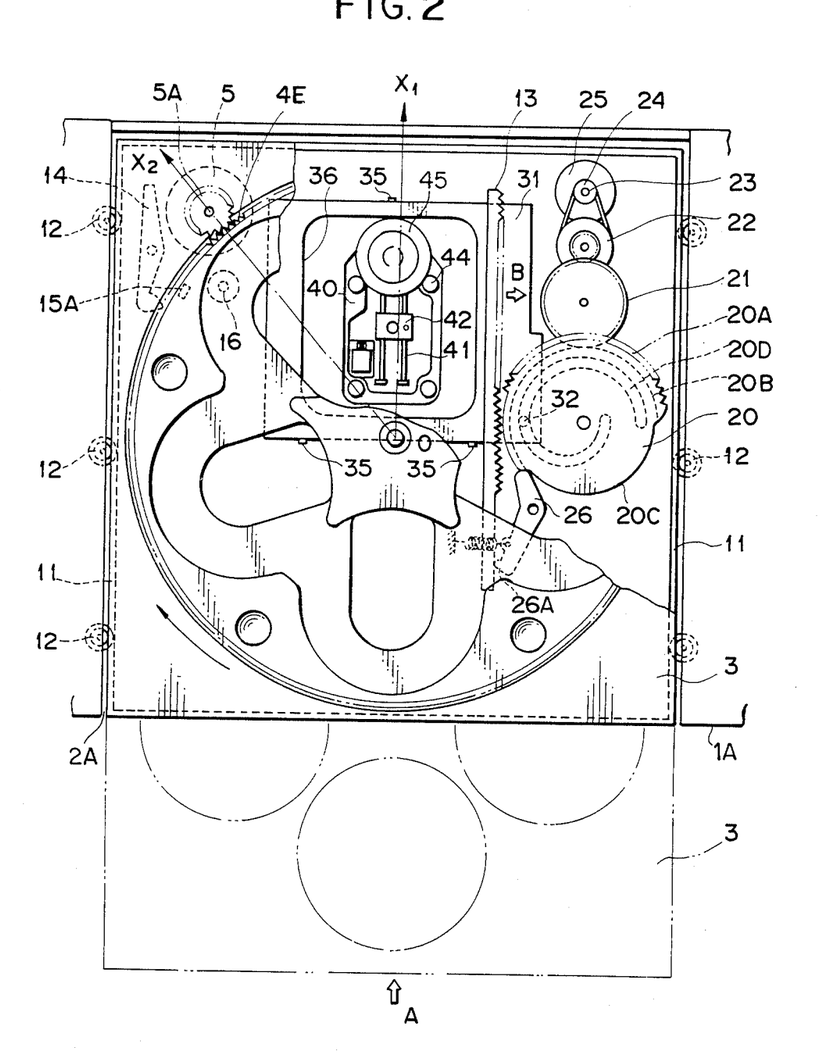
FIG. 2 is a plan view of a mechanism included in the disc player of FIG. 1 for placing a slide table in a loading position.

A motor 5 is attached to the lower surface of the slide table 3 for rotating the disc tray 4, for example, by means of a gear 5A mounted on the motor shaft and meshing with gear teeth 4E formed along the circumference of the rotary disc tray 4 (FIG. 2). A chucking arm 6 is mounted on the back portion of the slide table 3, and a disc presser 6A-6C is attached rotatably to the forward end of the chucking arm 6. When the slide table 3 is in the position shown in full lines on FIG. 2, the disc presser 6A-6C is disposed above a turntable 45 and serves to hold under pressure the disc placed on the turntable, as hereinafter described in detail.

A electronic circuit board 7 is secured on the top surface of the chassis 1 through a support plate 7A.

As shown in FIG. 2, the slide table 3 is rendered slidable by grooved guides 11 formed along the two sides thereof and engaged by guide rollers 12 suitably rotatably mounted in the casing. On the lower surface of the slide table 3 is secured a rack 13 (FIGS. 2 and 3) engageable by a gear segment 20A on a loading gear 20.

There are also shown a rotation stopper or pawl 14 actuated by an electromagnetic plunger 76A (FIG. 7) or the like; a microswitch 15A for detecting the rotational position of the disc tray 4; and a photoelectric sensor 16 for sensing the presence or absence of a disc in a disc storage area 4A of the tray 4. These components are attached fixedly to the slide table 3 and serve to detect and set the position of the disc tray 4 as will be described later.

The loading gear 20 is supported rotatably on the chassis 1 as illustrated in FIG. 2 and is controllably rotated in the below described manner, through speed reduction gears 21 and 22, a belt 23, and a pulley 24, by a reversible loading motor 25.

The slide table 3 is moved in the direction indicated by an arrow A on FIG. 2 from an extended or first position shown in dot-dash lines to a second or loading position shown in full lines when the rack 13 attached to the lower surface of the table 3 is driven by the gear teeth 20A which are formed along half the circumference of the loading gear 20 as described previously, and a stopper plate or pawl 26 is rocked by engagement with a toothless portion 20B of the circumference to lock the rack 13 for holding table 3 in its loading position.

Figure 3:
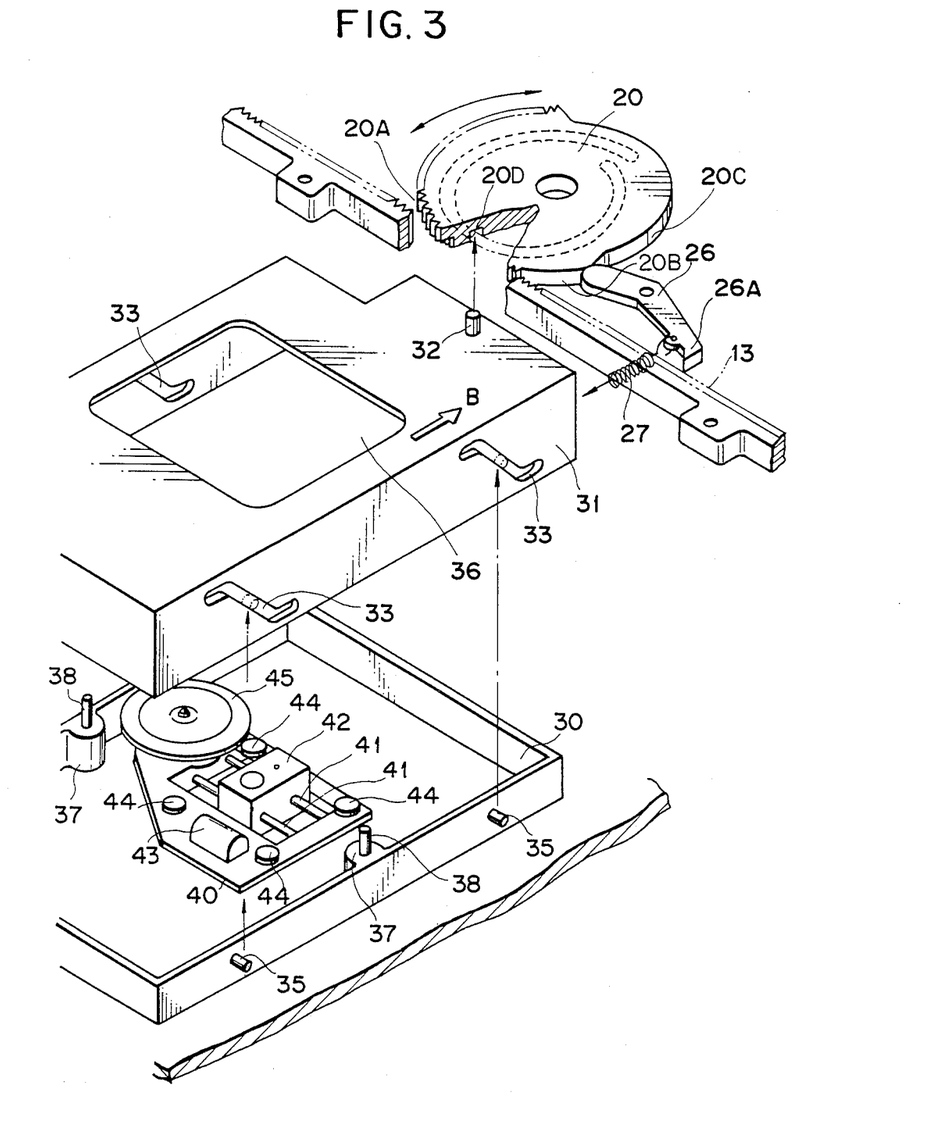
FIG. 3 is an exploded perspective view of a drive mechanism for an optical block and turntable included in the disc player of FIG. 1.

On the lower surface of the loading gear 20 is formed a spiral cam groove 20D which receives a cam-follower pin 32 extending from a sub-chassis 31 for lifting a vertical shift deck 30 illustrated in FIG. 3. At the front and back of such sub-chassis 31, there are formed pairs of oblique guide slots 33 into which guide pins 35, extending from the front and back of the deck 30, are loosely fitted. The deck 30 is mounted for limited vertical movements relative to the chassis 1, for example, by means of vertical guide shafts 38 suitably fixed to the chassis and being slidably received in bearings 37 provided on deck 30.

Consequently, when the loading gear 20 is rotated clockwise, as viewed on FIG. 2, first the rack 13 attached to the slide table 3 is drawn into the casing in the direction of an arrow A as shown in FIG. 2, whereupon the gear teeth 20A are disengaged from the rack 13 after about half a rotation. Then one end of the stopper plate or pawl 26 pressed against the cam surface 20B of the loading gear 20 moves off the surface 20B and is engaged by another cam surface 20C having a smaller diameter, so that the stopper plate or pawl 26 is turned clockwise by means of a spring 27, and the rack 13 is locked by the nose 26A of the stopper plate 26.

With further rotation of the loading gear 20, the cam follower pin 32 fitted in the cam groove 20D is moved toward the center of the loading gear 20, so that the sub-chassis 31 is also moved in the direction of an arrow B on FIGS. 2 and 3. At this time, since bearings 37 of the vertical shift deck 30 are engaged with guide shafts 38 fixed on the chassis 1, deck 30 can not move laterally with sub-chassis 31 and guide pins 35 of the vertical shift deck 30 under the sub-chassis 31 are raised by the respective oblique guide slots 33, whereby the deck 30 is shifted upward.

Consequently, an optical pick-up 42 and the turntable 45 mounted on the deck 30 are made to project upwardly through an opening 36 formed through the upper surface of the sub-chassis 31.

More particularly, a mechanical deck 40 is attached to the vertical shift deck 30 via support members 44 of a shock-absorbing elastic material. Feed shafts 41, 41 are installed fixedly on the mechanical deck 40, and the optical pickup 42 is slidably mounted with respect to the feed shafts 41, 41 and is moved therealong by a feed motor 43 attached to the mechanical deck 40.

The turntable 45 for mounting a disc thereon and a turntable driving motor 46 (FIG. 4) are also attached to the mechanical deck 40. However, the turntable 45 and the motor 46 may be anchored directly to the vertical shift deck 30.

Figure 4:
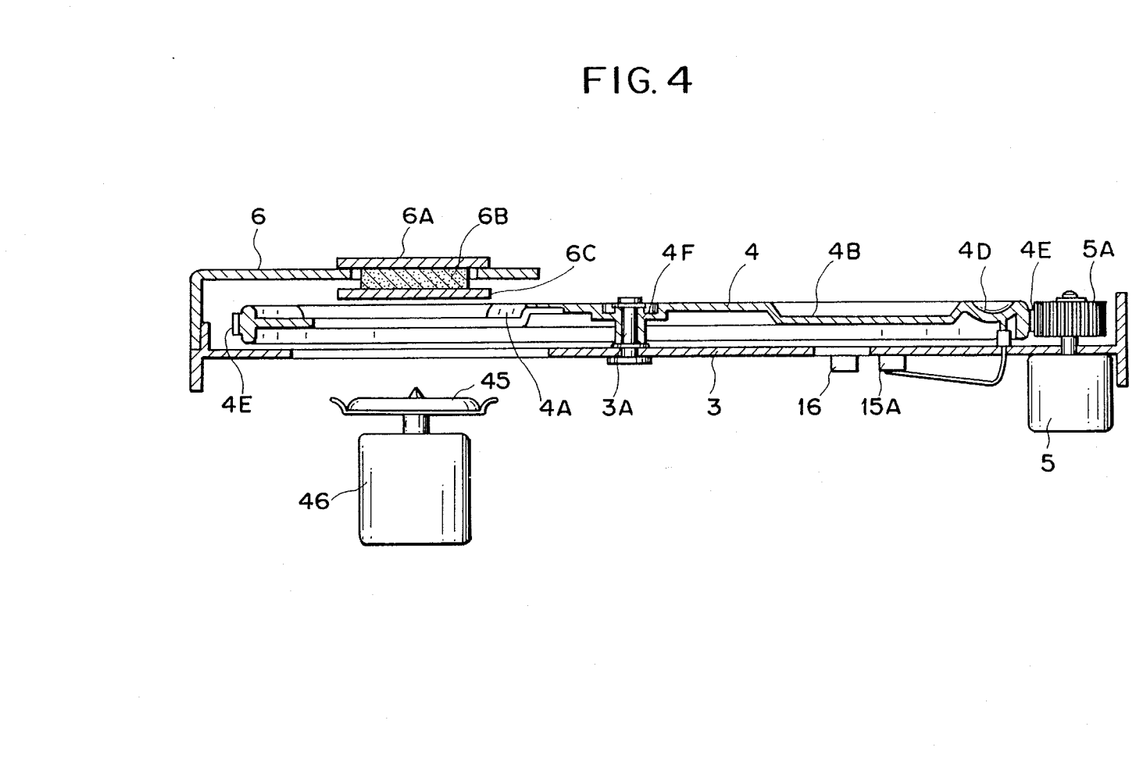
FIG. 4 is a partial sectional view of a rotary disc tray as viewed along the line $X_1$-O-$X_2$ on FIG. 2.

As shown on FIG. 4, the disc tray 4 has a center hub 4F rotatably mounted on an axle 3A affixed to the slide table 3.

Figure 5:
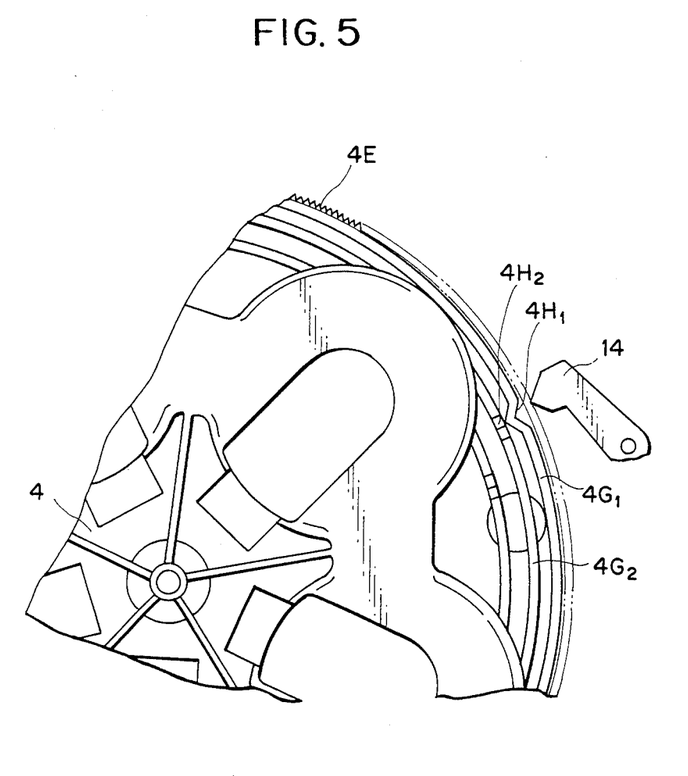
FIG. 5 is a fragmentary plan view of the underside of the disc tray for showing a detection mechanism for detecting and setting the position of the rotary disc tray.

On the underside of the disc tray 4, there are provided three circular ribs 4G1, 4G2 and 4G3 as shown in FIG. 5. The outermost circular rib 4G1 has five positioning recesses or detents 4H1 directed radially outward at equiangular intervals correspondingly to the number of the disc storage areas 4A, and the intermediate circular rib 4G2 has ten rotational position sensing notches 4H2 opening downwardly at equiangular intervals correspondingly to double the number of the disc storage areas.

The notches 4H2 are formed to specify the positions of the disc storage areas 4A.

Therefore the recesses 4H1 are required to be at least equal in number to the stop positions or disk storage areas of the disc tray 4 and, when the number of the disc storage areas is even, it is preferred that the notches 4H2 be arrayed at equiangular intervals as will be described later.

Although in the example of FIG. 4 a microswitch 15A is disposed under the slide table 3 for sensing the notches 4H2, it is possible to employ some other optical or magnetic sensor as well.

The chucking arm 6 is anchored at the back end of the slide table 3, and the disc presser consisting of a support plate 6A, a magnet 6B and a presser plate 6C is rotatably supported by the chucking arm 6. When, the turntable 45 and the turntable driving motor 46 are moved upward in accordance with the ascent of the vertical shift deck 30, a disc placed on one of the disc storage areas 4A is held between the turntable 45 and the disc presser, while being slightly lifted upward from the respective disc storage area 4A, by the attraction of the magnet 6B of the disc presser exerted on the turntable 45.

Figure 6:
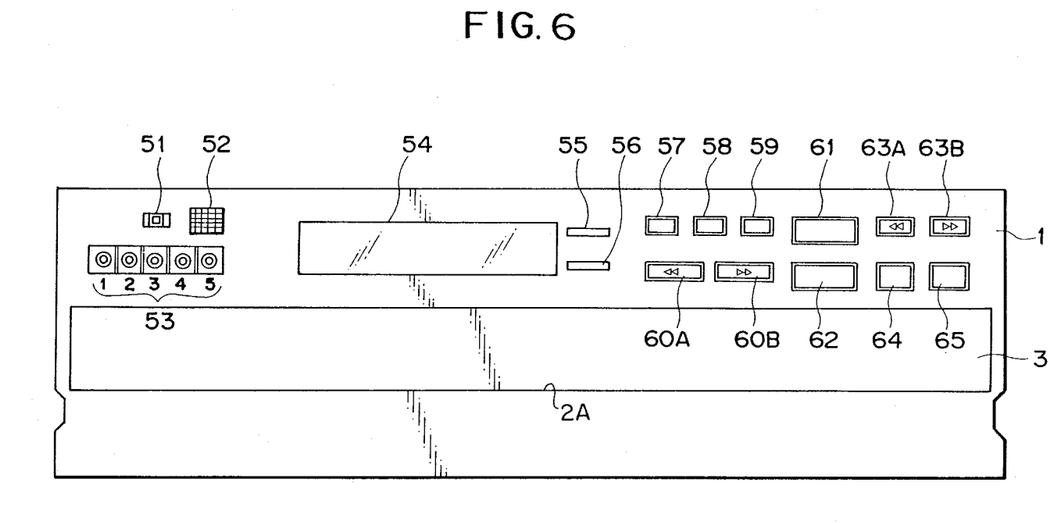
FIG. 6 is a front view of an exemplary control panel of the disc player embodying the invention.

FIG. 6 shows an exemplary front panel of the disc player according to the present invention, wherein there are included a selector switch 51 for selecting either a single-disc play mode or an all-discs play mode;

an infrared-ray receiving window 52 for remote control of the player; a program key 53 equipped with a display function and capable of displaying or selecting the number of a stored disc or that of the disc being played; a display 54 for displaying the disc play time, piece number and so forth as in the conventional disc player; a repeat button 55; a changeover button 56 for selectively changing the content of the display 54; a disc skip button 57 for rotating, when pressed once, the disc tray 4 by an angle of 360°/N (in which N is the number of stored discs); a program memory button 58; a clear button 59; cueing buttons 60A and 60B for locating a desired spot on the disc being played; and a table drive button 61 for moving in and out the slide table 3.

There are further shown control buttons which are employed in any ordinary disc player, and which respectively constitute a start button 62, a fast-forward button 63A, and fast reverse button 63B, a pause button 64 and a stop button 65.

In the disc player described above, when the table drive button 61 is depressed, the slide table 3 is displaced forwardly through the front opening 2A of the casing as illustrated in FIG. 1 to be ready for loading discs.

With slide table 3 thus positioned in its extended or first position, if the foremost disc storage area 4A of the slide table 3 is not vacant, the disc tray 4 is rotated either manually or by depressing the disc skip button 57 to bring a vacant disc storage area 4A to the front, so that a desired disc to be played can be loaded thereon or any unrequired disc can be taken out for replacement with a new one.

Figure 7:
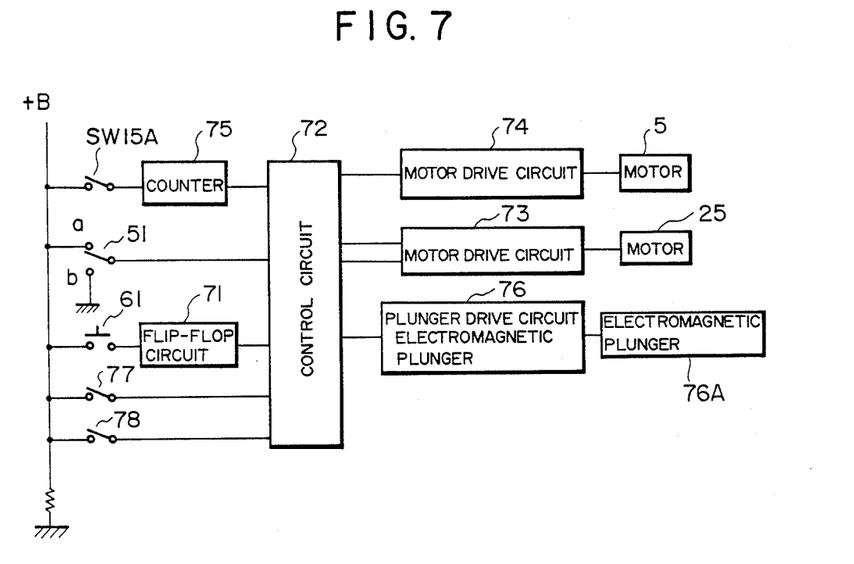
FIG. 7 is a circuit block diagram of the control system for the disc player embodying the invention.

When the selector button 51 is set so that the respective switch engages its contact a as illustrated in FIG. 7 to select the single-disc play mode, the disc player is rendered ready for reproduction or playback when the slide table 3 drawn back into the casing by depressing the table drive button 61.

When the button 61 is depressed once for moving the slide table 3 inward, a high-level (H) signal is fed from a flip-flop circuit 71 to a control circuit 72, whose output is then fed to a motor drive circuit 73 to rotate the loading motor 25 in its forward direction. As a result, the loading gear 20 is rotated clockwise to engage with the rack 13 of the slide table 3, so that the slide table 3 is drawn into the casing to its loading or fully retracted second position and locked therein by the stopper pawl 26. Meanwhile, during the operation of drawing in the slide table 3, the output of the control circuit 72 is fed to the motor drive circuit 74 to start rotation of the motor 5, and a pulse is generated, during rotation of the motor 5, each time the microswitch 15A is actuated by a notch 4H2 formed in the circular rib 4G2 on the under side of the disc tray 4. The pulses thus generated are counted by means of a counter 75, and an output signal from the latter produced upon arrival of the count at a predetermined value is fed to the control circuit 72, whereby a drive command signal fed from the control circuit 72 to the motor drive circuit 74 is interrupted to stop the motor 5. When the rotation lock or pawl 14 is released by energizing an electromagnetic plunger 76A through a plunger drive circuit 76, the disc tray 4 is free to be driven to make a half rotation, which corresponds to a count of five notches 4H2 in this embodiment. Thereafter, plunger 76A is deenergized so that pawl 14 again engages gear teeth 4E for locking disc tray 4. Thus, the disc tray 4 is so rotated that the foremost disc loaded thereon with table 3 in its first position is brought to the play position with table 3 in its second position. Subsequently, with the next half rotation of the loading gear 20, the sub-chassis 31 is moved transversely and, as mentioned previously, the optical pickup 42 and the turntable 45 are lifted upward together with ascent of the vertical shift deck 30. When the slide table 3 is drawn fully in, the foremost disc on the disc tray 4 is held between the turntable 45 and the disc presser 6A-6C. At this moment, the output of a switch 77 which may be actuated by the loading gear 20 is fed to the control circuit, so that a drive command signal from the control circuit 73 is interrupted to halt the rotation of the loading motor 25.

In the next stage, the turntable drive motor 46 is started and a focus servo, a tracking servo and so forth are actuated in a conventional manner for playing the disc.

As described hereinabove, in a single-disc play mode, the disc placed in the foremost position on the slide table 3 with the latter in its extended position is automatically brought to the play position at the termination of the loading operation.

When the table drive button 61 is again depressed once with the slide table 3 in its second or loading position shown in full lines on FIG. 2, a low-level (L) signal is fed from the flip-flop circuit 71 to the control circuit 72, and then a reverse drive command signal is fed from the control circuit 72 to the motor drive circuit 73 to reverse the loading motor 25, whereby the optical pickup 42 and the turntable 45 are moved downward together with descent of the vertical shift deck 30 and the loading gear 20 is engaged with the rack 13 of the slide table 3, which is thereby drawn out from the casing. The motor 5 is rotated during such drawing-out operation, and the microswitch 15A is actuated by the recesses 4H2. The motor 5 is continuously rotated until the counted value of five is attained and then is brought to a halt. Consequently, at the termination of the unloading operation, the disc previously placed in the play position is brought to the foremost position on the disc tray 4. In this manner, the disc player of the present invention can be used by the same procedure as in any ordinary disc player.

The completion of the above-mentioned drawing-out operation is detected by a switch 78 (FIG. 7) which may also be actuated by the loading gear 20, and the loading motor 25 is brought to a halt in response to such detection. The switches 77 and 78 may be actuated by respective projections (not shown) formed on the upper surface of the loading gear 20.

When the selector button 51 is set to select a continuous play mode by engagement of its respective switch with the contact b, the disc tray 4 is rotated, upon completion of reproducing of the disc at the play position, through an angle corresponding to the angular spacing between the adjacent disc storage areas 4A in the direction of the arrow Z on FIG. 2, whereby the next disc is made ready to be played. Therefore, if five discs are stored, all of such five discs can be played in sequence.

When the continuous play mode is selected, the disc tray 4 is turned incrementally through one rotation at the time of the loading of the discs in the storage areas 4A, and the presence or absence of a disc in each disc storage 4A is detected by a photosensor 16 (FIG. 4) or the like attached to the lower surface of the slide table. The result of such detection is displayed on the program key 53 equipped with a display function and is also stored simultaneously in an internal CPU. Thus, any vacant disc storage area can be skipped over and such vacant disc storage area is not halted at the play position during operation in the continuous play mode.

The sequence of playing the discs can be specified by the program button 58 in a continuous play mode, and a longer play time can be achieved by actuating the repeat button 55.

By way of summary, it will be noted that, in the disc player according to the present invention, a rotary disc tray is provided on a slide table which slides in and out of a casing to store a plurality of discs in the casing, so that the reproduction capability can be far enhanced in comparison with the conventional player, and remarkable facility is achievable with regard to the changing and insertion of discs. Furthermore, in a normal play mode, the disc loaded on the disc tray is made ready for reproduction exactly as in the known disc player, so that the reproducing procedure can be simplified with the advantage that the whole player structure is rendered compact.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope of spirit of the invention, as defined in the appended claims.

What is claimed is:

1. A disc player comprising: a casing having an opening at the front thereof; a slide table mounted to slide horizontally into and out of said casing through said opening between a first position extending outside of said casing and a second position within said casing; a disc tray supported rotatably on said slide table for turning about an axis at the center of said disc tray and having a plurality of disc storage areas arranged about said center of the disc tray to store a plurality of discs on said disc tray; drive means for rotating said disc tray and halting it at predetermined positions; an optical pickup and a turntable disposed within said casing at a play position for reproducing a disc placed at said play position by said disc tray; and loading means operative in a first mode for displacing said slide table from said first position extending outside of the casing to said second position within the casing, and for controlling turning of said disc tray so that the foremost of said disc storage areas of said disc tray when said slide table is in said first position is rotated to said play position when said slide table is in said second position.

2. The disc player as in claim 1;, wherein said loading means includes means for moving said optical pickup and said turntable upwardly with respect to said disc tray when said slide table is at said second position so that said turntable lifts a disc from said disc storage area at said play position; and further comprising disc presser means located so that the lifted disc is held between said turntable and said disc presser means while being kept afloat from said disc tray.

3. The disc player as in claim 1; wherein said loading means is operative in a second mode for displacing said slide table from said second position in said casing to said first position extending outside of said casing, and the disc storage area of said disc tray which is at said play position when said slide table is in said second position is rotated to the foremost position of said disc tray when said slide table is displaced to said first position.

4. The disc player as in claim 1; further comprising means for selecting a continuous play mode of the disc player in which, with said slide table in said second position, said drive means for the disc tray is made operative, upon the completion of the reproducing of a disc at said play position, to turn said disc tray through an angle equivalent to the angular spacing between adjacent ones of said disc storage areas so as to bring another disc to said play position for reproduction by said optical pickup.

5. The disc player as in claim 4; further comprising means for detecting the absence of a disc from any one of said disc storage areas so that, upon the turning of said disc tray with said slide table in said second position, each of said disc storage areas from which a disc is detected to be absent is moved past said play position.

* * * * *